US010994237B2

United States Patent
Spiegel (10) Patent No.: US 10,994,237 B2
(45) Date of Patent: May 4, 2021

(54) FILTER BAGS COMPRISING A POROUS MEMBRANE

(71) Applicant: W. L. Gore & Associates, Inc., Newark, DE (US)

(72) Inventor: Rebecca Spiegel, Newark, DE (US)

(73) Assignee: W. L. Gore & Associates, Inc., Newark, DE (US)

( * ) Notice: Subject to any disclaimer, the term of this patent is extended or adjusted under 35 U.S.C. 154(b) by 0 days.

(21) Appl. No.: 15/930,181

(22) Filed: May 12, 2020

(65) Prior Publication Data

US 2020/0269181 A1    Aug. 27, 2020

Related U.S. Application Data (63) Continuation of application No. PCT/US2017/061301, filed on Nov. 13, 2017.

(51) Int. Cl.
*B01D 39/16* (2006.01)
*B01D 46/54* (2006.01)
(Continued)

(52) U.S. Cl.
CPC ......... *B01D 46/543* (2013.01); *B01D 39/086* (2013.01); *B01D 39/1623* (2013.01);
(Continued)

(58) Field of Classification Search
CPC .............. B01D 39/086; B01D 39/1623; B01D 39/1692; B01D 46/543; B01D 46/0027;
(Continued)

(56) References Cited

U.S. PATENT DOCUMENTS 5,096,473 A * 3/1992 Sassa ................... B01D 39/083
                                                      95/282
5,928,414 A * 7/1999 Wnenchak ......... B01D 39/1692
                                                      55/302
(Continued)

FOREIGN PATENT DOCUMENTS

| EP | 0 391 660 A2 | 10/1990 |
| JP | 2002-172316 * | 6/2002 |
| WO | 00/02639 A2 | 1/2000 |

OTHER PUBLICATIONS

International Search Report and Written Opinion from International Application No. PCT/US2017/061301 dated Jun. 14, 2018.

*Primary Examiner* — Frank M Lawrence, Jr.
(74) *Attorney, Agent, or Firm* — Greenberg Traurig LLP (57) ABSTRACT

A filter bag is disclosed that comprises a porous membrane having a strength in the transverse direction to improve durability. There is a filter assembly for filtering particulates from a gas stream comprising a support substructure and a filter bag at least partially surrounding the support substructure. The filter bag comprises a porous membrane having a upstream surface exposed to the gas stream. The porous membrane is lightweight and has a structure to collect the particulates on the upstream surface. In particular, the porous membrane has a bubble point of 0.06 MPa or more and has a strength in a transverse direction that is 100 N/m or more. Other filter bags disclosed comprise a laminate comprising a porous membrane having a bubble point of 0.06 MPa or more and a second layer that acts as a sacrificial material.

1 Claim, 6 Drawing Sheets (51) Int. Cl.
*B01D 39/08* (2006.01)
*B01D 46/00* (2006.01)
*B01D 46/02* (2006.01)
*B01D 53/88* (2006.01)
*B01J 20/26* (2006.01)
*B01J 20/28* (2006.01)
*B32B 5/02* (2006.01)
*B32B 27/32* (2006.01)
*B32B 27/12* (2006.01)

(52) U.S. Cl.
CPC ..... *B01D 39/1692* (2013.01); *B01D 46/0027* (2013.01); *B01D 46/02* (2013.01); *B01D 53/885* (2013.01); *B01J 20/261* (2013.01); *B01J 20/2804* (2013.01); *B01J 20/28035* (2013.01); *B01J 20/28038* (2013.01); *B32B 5/022* (2013.01); *B32B 27/12* (2013.01); *B32B 27/322* (2013.01); *B01D 2239/0407* (2013.01); *B01D 2239/0613* (2013.01); *B01D 2239/0618* (2013.01); *B01D 2239/0654* (2013.01); *B01D 2239/1216* (2013.01); *B01D 2239/1258* (2013.01); *B01D 2255/915* (2013.01); *B32B 2262/0253* (2013.01); *B32B 2307/5825* (2013.01); *B32B 2307/724* (2013.01)

(58) Field of Classification Search
CPC ................. B01D 46/02; B01D 53/885; B01D 2239/0407; B01D 2239/0613; B01D 2239/0618; B01D 2239/0654; B01D 2239/1216; B01D 2239/1258; B01D 2255/915; B01J 20/261; B01J 20/28035; B01J 20/28038; B01J 20/2804; B32B 5/022; B32B 27/322; B32B 27/12; B32B 2262/0253; B32B 2307/5825; B32B 2307/724

USPC ....... 55/292, 293, 302, 341.1, 361, 381, 382
See application file for complete search history.

(56) References Cited

U.S. PATENT DOCUMENTS

| | | | | |
|---|---|---|---|---|
| 6,517,919 | B1* | 2/2003 | Griffin | B01D 39/1692 |
| | | | | 428/36.1 |
| 7,501,003 | B2* | 3/2009 | Muller | B01D 46/0032 |
| | | | | 55/382 |
| 8,007,573 | B2* | 8/2011 | Bansal | B01D 53/228 |
| | | | | 422/180 |
| 2011/0146493 | A1* | 6/2011 | Thottupurathu | B01D 46/02 |
| | | | | 96/12 |
| 2011/0206564 | A1* | 8/2011 | Parent | D04H 1/4326 |
| | | | | 422/177 |

* cited by examiner

FILTER BAGS COMPRISING A POROUS MEMBRANE

TECHNICAL FIELD

The present invention relates generally to a filter bag comprising a porous membrane. In particular, the porous membrane may be attached to a filter media or laminated with a second layer that is attached to the filter media. The porous membranes are durable to resist stress incurred by cleaning cycles.

BACKGROUND

The removal of particulates from a gas stream has long been a practice in a variety of industrial fields. Conventional means for filtering particulates and the like from gas streams include, but are not limited to, filter bags, filter tubes, filter cartridges and filter panels. These filter elements are typically oriented into a filtration system, often referred to as a filter baghouse, for filtering such particulates. Such filtration systems may be either cleanable or non-cleanable, depending on the requirements of the system operation.

The separation of particulate matter from industrial fluid streams is often accomplished using laminate filters. These textile-based laminate filters remove particulates from fluid streams. When the resistance to flow or pressure drop through the textile caused by accumulation of particulate on the filter becomes significant, the filter must be cleaned, and the particulate removed from the filter.

It is common in the industrial filtration market to characterize the type of filter bag by the method of cleaning. The most common types of cleaning techniques are reverse air, shaker, and pulse-jet. Reverse air and shaker techniques are considered low energy cleaning techniques.

In reverse air filtration techniques, particulate collects on the interior of the bag. During cleanings, a gentle backwash of air collapses the bag and fractures the dust cake off the bag, which exits the bottom of the bag into a hopper.

Shaker mechanisms also clean dust cakes that collect on the inside of a bag. The top of the bag is attached to an oscillating arm which creates a sinusoidal wave in the bag to dislodge the dust cake.

In pulse-jet filtration, the particulate is captured on the outside of the bag. Pulse-jet cleaning techniques employ a short pulse of compressed air that enters the interior top portion of a filter bag or tube. The energy of this cleaning pulse expands the bag, knocking off the dust cake. The bag will typically snap back to a cage support and go right back into service collecting particulate.

Of the three cleaning techniques, pulse-jet is the most stressful on the filter media. However, in recent years, industrial process engineers have increasingly selected pulse-jet baghouses for dust collection applications because of:

1. Smaller unit size (sometimes as much as ½ or ¼ the size of shakers and reverse air filtration) due to:
 (A) higher volumetric airflow/cloth area ratio (higher operating velocity through media); and
 (B) on-line cleaning allows the unit to be designed at the desired flow rate, hence there is no need for additional filter media area to allow for off-line cleaning.
2. Minimal number of moving parts.
3. Lower number of bags to replace.

In a pulse-jet baghouse, bags are inserted into the baghouse with a metal cage on the inside to keep them from collapsing. Dirty air containing dust enters the baghouse on the outer side of the bag where the dust accumulates on the surface. The cleaned air travels through the bag and out of the baghouse. When a sufficient amount of dust has accumulated on the outside of the bag to cause a decreased amount of air flow through the bag, the pulse-jet baghouse sends a pulse of high pressure air backwards through the bag. The accumulated dust is forced off the bag for collection in the lower portion of the baghouse by a combination of the high pressure air and the movement in the bag caused by the back pulse. This cleaning process may occur multiple times an hour to maintain sufficient air flow through the bag.

The movement in the bag mentioned above is a result of high pressure air imparting a stress on the bag.

U.S. Pat. No. 6,110,243 is directed to filter bag assemblies comprising a support structure, such as a support cage of metal, plastic, or the like, and a filter media of expanded PTFE membrane(s) without a backing material or layer. As described, the filter bag assembly further comprises a support cover, or cage cover, which fits over the exterior surface of the support, or cage, to prevent contact of the filter media with the cage.

A continuing problem of improving durability exists for filter bag assemblies. Thus, it is apparent that it would be advantageous to provide an improved filter bag assembly directed to overcoming one or more of the limitations set forth above.

BRIEF SUMMARY OF SOME EXAMPLE EMBODIMENTS

According to one embodiment of the present invention, there is provided a filter assembly for filtering particulates from a gas stream comprising: a filter bag comprising a filter media and a porous membrane having an upstream surface exposed to the gas stream and a downstream surface adjacent to the filter media, wherein the porous membrane has a bubble point of 0.06 MPa or more, e.g. 0.09 MPa or more, and wherein the porous membrane has a strength in a transverse direction that is 100 N/m or more, e.g., 175 N/m or more, wherein the filter assembly is cleanable. In one embodiment, the porous membrane is capable of withstanding structural failures caused by stresses of a cleaning process, e.g., shaking or pulsing, to release the collected particulates from the upstream surface of the porous membrane. The porous membrane has a structure to collect the particulates on the upstream surface. Further, the porous membrane may collect more than 97% of the particulates having a diameter of greater than 0.07 microns from the gas stream.

According to another embodiment of the present invention, there is provided a filter assembly for filtering particulates from a gas stream comprising a filter bag comprising a filter media, a porous membrane having an upstream surface exposed to the gas stream, and second layer, wherein the second layer is disposed between the filter media and porous membrane, wherein the porous membrane has a bubble point of 0.06 MPa or more, e.g. 0.09 MPa or more, wherein the filter assembly is cleanable. The porous membrane adjacent to the second layer has a strength in a transverse direction that may be 50 N/m or more, e.g., 100 N/m or more or 175 N/m or more. In one embodiment, the second layer comprises a woven textile, a non-woven textile, or a membrane. The second layer acts a sacrificial layer and prevents damage to the porous membrane from the filter media or stresses of the cleaning process. In one embodiment, the second layer has a permeability of 10 cfm/ft² @ 0.5 inch gauge of water. The second layer may be laminated to the porous membrane to form a laminate. Alternatively, the second layer may be laminated to the filter media.

In one embodiment, the porous membrane comprises a fluoropolymer membrane or a polyester membrane. Along with the high bubble point and/or high transverse strength, the porous membrane may have one or more of the following characteristics. The porous membrane may have a mass per area ratio of 4.5 gsm or less. The porous membrane may also have a Ball Burst strength of 1.36 kg or less. In addition, the porous membrane may have a permeability of 1 cfm/ft$^2$ @ 0.5 inch gauge of water. Further, the porous membrane has a thickness from 5 to 50 microns.

In one embodiment, the filter media comprises a woven felt, non-woven felt or a fiberglass material. Depending on the type of bag there may be a support substructure that is adjacent to the filter media.

In another embodiment, there is provided a baghouse filter system comprising a housing having an inlet and an outlet, a tube sheet positioned within the housing between the inlet and outlet, and one or more of the filter bag assemblies mounted to the tube sheet, wherein the filter bag assemblies each comprise a filter bag comprising a filter media and a porous membrane having an upstream surface exposed to the gas stream and a downstream surface adjacent to the filter media, wherein the porous membrane has a bubble point of 0.06 MPa or more, e.g. 0.09 MPa or more, and wherein the porous membrane has a strength in a transverse direction that is 100 N/m or more, e.g., 175 N/m or more.

In further another embodiment, there is provided a baghouse filter system comprising a housing having an inlet and an outlet, a tube sheet positioned within the housing between the inlet and outlet, and one or more of the filter bag assemblies mounted to the tube sheet, wherein the filter bag assemblies each comprise a filter bag comprising a filter media, a porous membrane having an upstream surface exposed to the gas stream, and second layer, wherein the second layer is disposed between the filter media and porous membrane, wherein the porous membrane has a bubble point of 0.06 MPa or more, e.g. 0.09 MPa or more.

These and other embodiments, along with many of their advantages and features, are described in more detail in conjunction with the below description and attached figures.

BRIEF DESCRIPTION OF THE DRAWINGS

The present invention will be better understood in view of the appended non-limiting figures.

DETAILED DESCRIPTION

Persons skilled in the art will readily appreciate that various aspects of the present disclosure can be realized by any number of methods and apparatus configured to perform the intended functions. It should also be noted that the accompanying figures referred to herein are not necessarily drawn to scale, but may be exaggerated to illustrate various aspects of the present disclosure, and in that regard, the drawing figures should not be construed as limiting.

Various embodiments described herein relate to a filter bag comprising a filter media and an adjacent durable porous membrane having a tight microstructure that provides improved cleanability. For purposes of the present invention, a bubble point of 0.06 MPa or more exhibits a tight microstructure. The problem with tight microstructure is that these membranes were expected to have significant increases in pressure drop which is detrimental to the filter bag. Further thin and/or lightweight membranes are also expected to have significant increases in pressure drop which is detrimental to the filter bag. In one embodiment, the porous membrane comprises a thin, tight membrane having a high strength in a transverse direction. In another embodiment, the porous membrane is laminated to a second layer, such as a membrane. The embodiments overcome the problems associated with pressure drop issues by using a thin and/or lightweight membrane with high strength in the transverse direction or by laminate the thin and/or lightweight membrane to a second layer leading to improved durability and cleanability of a filter bag. The filter bags described herein may be used in a filter assembly for filtering particulates from a gas stream, such as an exhaust gas stream. In one embodiment, a high-efficiency dust-collecting filter bag may be provided.

During operation the filter bag collects particulates on the upstream surface and the collected particulates are removed several times over the course of operation by cleaning. The filter assembly may be cleaned by removing the particulates that collect as a dust cake on the filter bag using a cleaning techniques such as reverse air, shaker, and pulse-jet. In one embodiment, acoustic cleaning via a sonic horn may be used in combination with these cleaning techniques. Sonic horns used in cleaning operations produce a low frequency, high-decibel acoustic energy—sound in the range of 60 to 250 Hz, at intensities up to 150 dB.

Embodiments of the present invention provide an advantage of achieving permeability while providing increased durability. As membranes become lighter and/or thinner, the membrane is more vulnerable to damage during the manufacturing process and cleaning process. Although structural damage in the form of cracks, tears, or ruptures, during the manufacturing process is inconvenient and costly, the membrane can be replaced prior to use. Once in use, any structural damage on the membrane reduces the lifetime of the filter bag which creates a significant durability problem.

In addition, further embodiments of the present invention provide a second layer that acts as a sacrificial layer for the porous membrane. This allows the thin, tight membrane described herein to be used in filter bags with filter media having an abrasive topology or with cleaning techniques that place stress on the filter bags.

The filter bags described herein may be used in a wide variety of applications where pollutant control or product capture is necessary. This includes power plants, steel mills, chemical producers, and other industrial companies where high particulate collection efficiency is desired. An exemplary embodiment according to the invention is a filter bag that is used in cement baghouses. Cement baghouses often employ filter media that have abrasive topologies.

An abrasive topology refers to the surface of the filter media having edges, points, or contours that creates a non-smooth surface. This non-smooth surface is capable of abrading, tearing, rupturing, lacerating, or otherwise damaging an adjacent membrane. Once the membrane is damaged, the filter bag loses efficiency in particulate removal.

Figure 1:
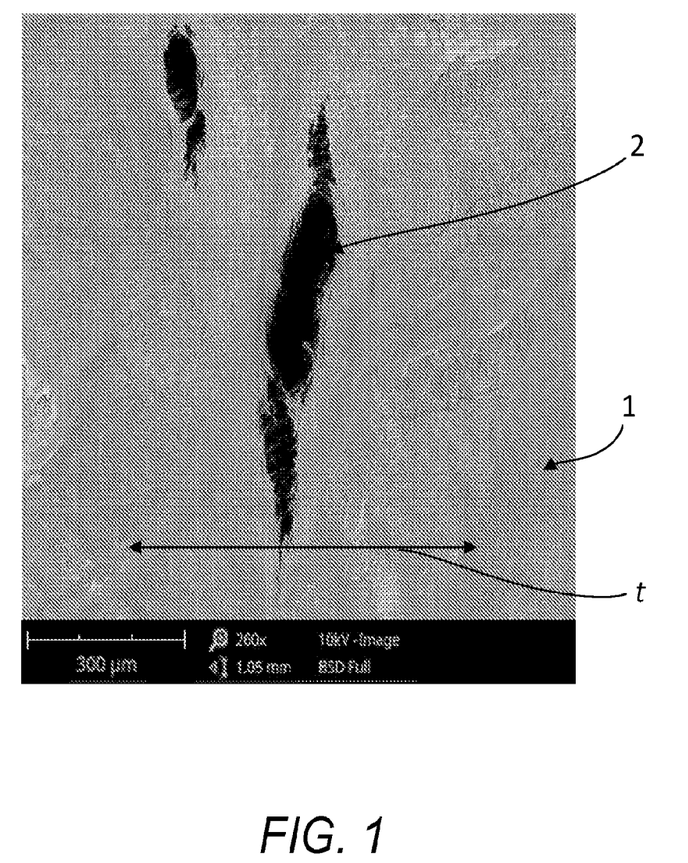
FIG. 1 is a SEM image of a membrane with structural failures due to a low membrane strength in the transverse direction.

The membrane may also be damaged due to the stresses caused during cleaning to remove the dust cake. The pulsing during cleaning may create additional stresses, including abrasive stress, even when the filter media has smooth surfaces. The repeated expansion and contraction of the filter bag against the support substructure and/or the filter media during cleaning may cause damage to the membrane. To overcome the problems caused by damage, one embodiment of the present invention uses membranes having a transverse strength that is 100 N/m or more, e.g., 120 N/m or more, 150 N/m or more, 175 N/m or more, or 200 N/m. Transverse strength can be determined using ASTM method D412-06a (2006), using die F. Transverse strength refers to the strength in the transverse direction on the filter bag, e.g., the direction around the circumference of the filter bag. As shown in the figures, the transverse direction is indicated by arrow (t). The transverse direction may be in the direction of the circumferential width of the filter bag which is non-parallel to the filter bag length, and in some embodiments may be perpendicular to the filter bag length. In one embodiment, this transverse strength property assists in providing a filter bag that has an externally facing membrane that is resilient and durable. Membranes with a transverse strength of less than 100 N/m that adjacent to the filter media suffer structural failures when subjected to stresses on the filter bag. As shown in FIG. 1, a membrane 1 having a strength of 94.5 N/m in the transverse direction t suffered visible ruptures 2 due to the lack of transverse strength in the membrane of FIG. 1. This indicates that the membrane 1 was less durable and the ruptures shortened the lifetime of the filter bag.

Filter Bag

The filter bags described herein include a membrane that provides high air flow and good dust cake release. This allows the filter bag to be easily cleaned while at the same time reducing the pressure drop associated with the filter bag. The membrane may be attached, either laminated or adhered, to a filter media, or the membrane may be adjacent to a second layer to form a laminate that is attached the filter media. The filter bag may have a variety of shapes and features depending on the operation and cleaning technique. In one embodiment, the filter bag for pulse-jet cleaning may have a cuff at one end and an opening at the other that allows the filter bag to at least partially surround a support substructure. Regardless of the design the filter bag having a porous membrane with a high transverse strength helps to increase durability of the filter bag, which would reduce particulate emissions to comply with emissions standards.

In a typical baghouse, each filter bag may have a length from 0.3 m to 10 m and an internal diameter from 5 cm to 30 cm. The filter bag may have dimensions that allow the filter bags to be mounted to the baghouse, fitted over the support substructure, or fitted with support substructures. It should be understood that these dimensions are not necessarily limiting for the purposes of the present invention and the embodiments disclosed herein may be used in a wide variety of baghouses.

In one embodiment, the filter bag may be pleated. A pleated filter bag may increase the depth of the filter media and exposes the filter media to less particulates in the stream.

Figure 2:
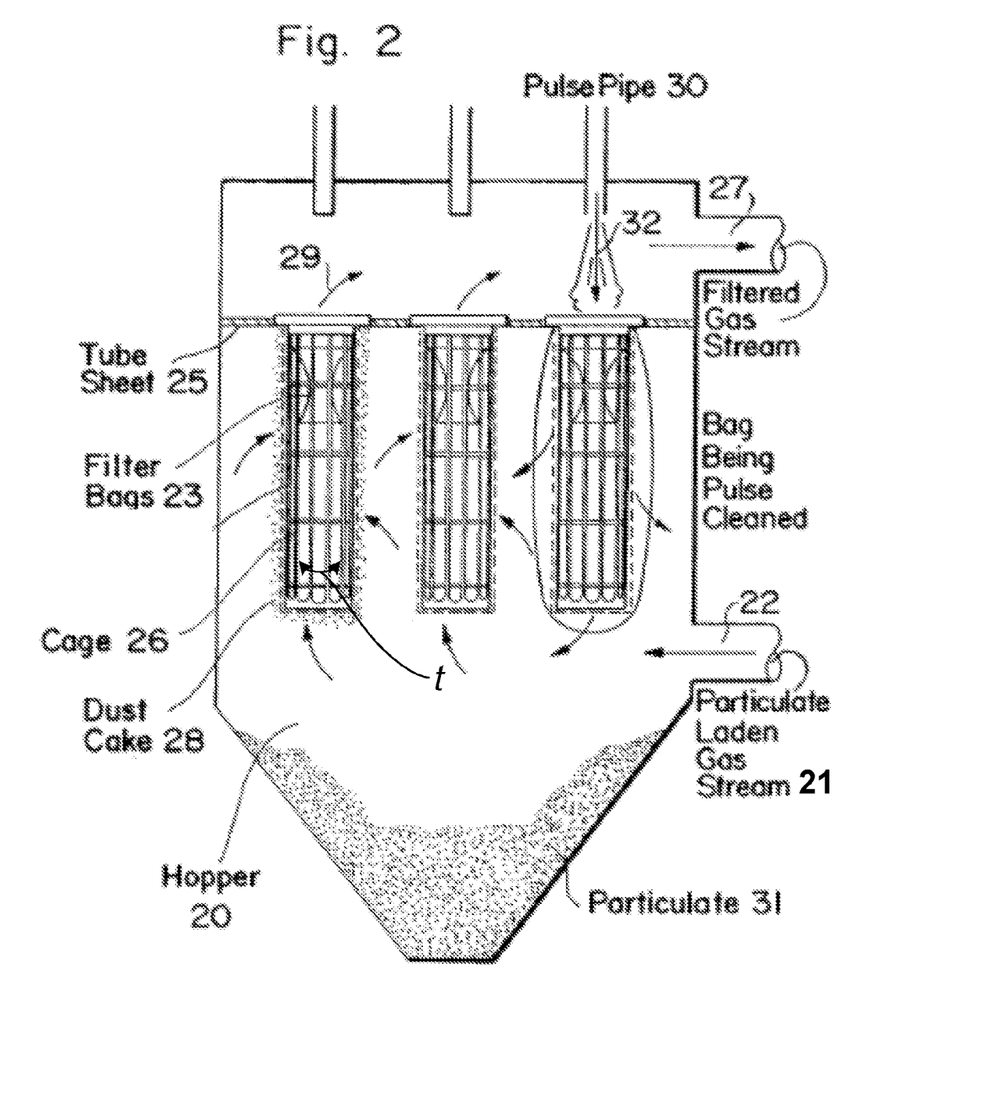
FIG. 2 shows a schematic view of a baghouse in accordance with the embodiments disclosed herein.

Referring now to FIG. 2, a baghouse having a pulse-jet cleaning sequence is shown. Inside hopper 20, particulate laden gas stream 21 enters the hopper at inlet 22 and passes through filter bag 23 comprising a porous membrane having a high strength in the transverse direction (t). The filter bag may comprise a porous membrane attached to a filter media or a laminate comprising the porous membrane that is attached to the filter media. Tube sheet 25 inside hopper 20 prevents the gas stream from bypassing the filter bag 23. The filter bag 23 is kept open by an internal supporting cage 26 (which is shown under the filter bag 23). The gas stream, after passing through the filter bag 23 and out bag exit 29, exits the clean air compartment at outlet 27. In operation, particulate forms a dust cake 28 on the outside of the porous membrane, as shown in the bag on the left of the figure. Upon cleaning to remove the dust cake 28, air from pulse pipe 30 enters the filter bag. This pulse of air 32 expands the filter bag, loosening the dust cake and thus causing particulate 31 to collect at the bottom of hopper 20. As seen in the bag on the right of FIG. 2, the pulse jet causes the filter bag to expand. The repeated expansion and contraction of the filter bag causes wear. It should be understood that other clean techniques also impart stresses on the filter bags. The advantage of the filter bags described herein is that the porous membrane has a tight microstructure as well as a higher strength in the transverse direction that improves durability and reduces the structural failures caused by stresses during the cleaning cycle.

Porous Membrane

In one embodiment, there is provided a cleanable filter bag assembly for filtering particulates from a gas stream comprising a filter bag. The filter bag comprises a porous membrane having an upstream surface exposed to the gas stream and a filter media attached to the porous membrane. In one embodiment, the porous membrane has a bubble point of 0.06 MPa or more, e.g., 0.1 MPa or more or 0.5 MPa or more. In one embodiment, the porous membrane has a strength in a transverse direction that is 100 N/m or more, e.g., 150 N/m or more, 175 N/m or more, or 200 N/m or more.

The porous membranes used in the filter bags described herein have several characteristics that are particularly advantageous for achieving the higher performance described herein. The membranes are capable of capturing fine particulate, have improved filtration efficiency, increased cake release, and increased air flow capacity in use. In one embodiment, the porous membrane collects more than 97% of the particulates in the gas stream having a diameter of greater than 0.07 microns. In a further embodiment, the porous membrane collects more than 99% of the particulates in the gas stream having a diameter of greater than 0.07 microns. When the porous membrane is attached to a filter media, the filter bag has a higher collection efficiency.

The porous membranes may comprise a fluoropolymer or a polyester material. A suitable fluoropolymer membrane includes polytetrafluoroethylene (PTFE) that is prepared by a number of different methods, including expanding the PTFE to form expanded polytetrafluoroethylene (ePTFE). Other suitable fluoropolymers may include polyvinylidene fluoride ("PVDF"), tetrafluoroethylene-hexafluoropropylene copolymer ("FEP"), tetrafluoroethylene-(perfluoroalkyl) vinyl ether copolymer ("PFA"), or the like.

The membrane has pores to allow the passage of fluid, either air or liquid, while retaining particulates such as fine dust. The porous nature of the membrane maintains differential pressure rise of less than 0.7 MPa, e.g., less than 0.5 MPa or less than 0.1 MPa, described in terms of the ISO-test method.

In one embodiment, the porous membrane is an ePTFE membrane having a tight microstructure having a bubble point that is 0.06 MPa or more, e.g., 0.1 MPa or more or 0.5 MPa or more. In terms of ranges, the bubble point is from 0.06 to 1 MPa, e.g., from 0.06 to 0.7 MPa or from 0.07 to 0.5 MPa. The ePTFE membranes may also have an average pore diameter that is 0.7 microns or less, e.g., 0.5 microns or less.

The ePTFE membrane may have a structure of a plurality of nodes and/or a plurality of fibrils that creates pores. In some embodiments, the ePTFE membrane is substantially fibrillated and contains a few nodes. The use of PTFE provides good heat resistance and chemical inertness. Porous ePTFE provides increased strength and stability that has a high transverse strength to withstand the stress caused by pulse jet cleaning. These stresses on the membrane are of two types. One caused by the sudden expansion during pulse jet cleaning. The other caused by sudden collapsing of the bag against its support substructure. The stresses are incurred repeatedly over the lifetime of the filter bag, which may be several years. For some applications of the filter bag, there may be more than a million pulse cycles in each year of operations.

The membranes used herein have a bubble point that is 0.06 MPa or more and a transverse strength that is 100 N/m or more to withstand structural failures, such as cracks, tears, or ruptures, upon application of an air flow to release the collected particulates from the upstream surface. For ePTFE membranes, high transverse strength may be achieved by biaxial stretching of an extruded PTFE tape.

Although the strength of the membranes in the transverse direction may be high enough to prevent structural failures, increased strength in the lateral direction is not required. The lateral direction extends along the length of the filter bag and is angled or perpendicular to the transverse direction. In one embodiment, the lateral strength is less than 100 N/m, e.g., less than 75 N/m or less than 50 N/m. Although lateral strength may be higher, it is not necessary to impart the benefits on the filter bag.

The use of the porous ePTFE membrane provides higher air flow rates, i.e. high permeability, suitable for good air filtration. The membranes are porous and have an air permeability of at least 1 cfm/ft$^2$ @ 0.5 inch gauge of water, e.g., at least 5 cfm/ft$^2$ @ 0.5 inch gauge of water or at least 10 cfm/ft$^2$ @ 0.5 inch gauge of water. Although low air permeability was previously used with liquid streams, the present inventors have found that a low air permeability membrane may be used in a filter bag with a higher bubble point.

A lightweight membrane may maintain the air flow and reduce the overall weight of the filter bag. Thus, in one embodiment there is provided a membrane having a mass per area ratio of 4.5 gsm or less, e.g., 4 gsm or less, 3 gsm or less or 1 gsm or less. Incidentally, the membrane may have a mass per area ratio range from 0.5 gsm to 4.5 gsm, e.g., from 0.5 gsm to 4 gsm, or from 0.5 to 3 gsm. Membranes having a mass per area ratio of greater than 5 gsm are heavier and tend to have reduced permeability that decreases the air flow.

Thinner membranes are generally lightweight and have good air permeability. In one embodiment, the membrane has a thickness from 5 to 50 microns, e.g., from 5 to 30 microns or from 10 to 30 microns. In some embodiments, membranes may be layered to achieve the desired thickness.

Although the membranes of the present invention have a high transverse strength, the membranes have a ball burst of 1.36 kg or less, e.g., 1.26 kg or less, or 1.16 kg or less. A reduced ball burst allows the membrane with a bubble point of greater than 0.06 MPa to maintain airflow with a lower rise in pressure differential. In addition, since the membrane is attached to the filter media, a reduced ball burst is desirable with the higher transverse strength.

In one embodiment, there is provided a cleanable filter bag assembly for filtering particulates from a gas stream comprising a support substructure, and a filter bag at least partially surrounding the support substructure, in which the filter bag comprises a porous membrane having an upstream surface exposed to the gas stream and a filter media attached to the porous membrane. The porous membrane has a strength in a transverse direction that is 100 N/m or more, and at least two of the following properties: an air permeability of at least 1 cfm/ft$^2$ @ 0.5 inch gauge of water, bubble point of 0.06 MPa or more, a mass per area ratio of 4.5 gsm or less, a thickness from 5 to 50 microns, and a ball burst of 1.36 kg or less. In a further embodiment, the porous membrane has bubble point of 0.06 MPa or more and a strength in a transverse direction that is 100 N/m or more, and at least one of the following properties: an air permeability of at least 1 cfm/ft$^2$ @ 0.5 inch gauge of water, a mass per area ratio of 4.5 gsm or less, a thickness from 5 to 50 microns, and a ball burst of 1.36 kg or less.

Filter Media

The membranes may be attached to the filter media using lamination, welding, sewing, tacking, clamping, or other suitable attachment means. In one embodiment, the membranes are adhered to the filter media using a continuous layer of adhesive or a discontinuous adhesives of dots and grids. A common adhesive is a fluorinated polymer adhesive, such as a fluorinated ethylene propylene (FEP) copolymer, is usually coated onto the filter media by transfer coating the top surface of the filter media with a PTFE dispersion or FEP aqueous dispersion. Other useful adhesives include tetrafluoroethylene/perfluoropropylene copolymer, polyvinylidene difluoride, and the like. In another embodiment, lamination of the porous ePTFE membrane to the coated side of the filter media is effected by laying the membrane on the coated side of the filter media, and heating to above the adhesive melting point with light pressure. In other embodiments, the filter media may comprise a PTFE or a thermoplastic material and may be melted to membrane without requiring a further adhesive.

In a baghouse, the filter media should be able to withstand high temperatures without degradation. The filter media is a backer material on to which the membrane may be adhered or laminated. Depending on chemical and/or moisture content of the gas stream, its temperature, and other conditions, filter bags may be constructed from fiberglass, polyester, cotton, nylon, or other materials. Felts and fibers made of PTFE, polyester, polypropylene, polyphenylene sulfide, aramid, or polyimide may also be used as the filter media. Commingling of fibers and filaments, such as fiberglass and PTFE, may also be employed as filter media. For high temperature applications of greater than 400° C., a woven PTFE, fiberglass or polyimide may be used as the filter media.

Commercially available PTFE fabrics are supported needlefelts of PTFE fiber. These felts usually weight from 650-900 g/m² and may be reinforced with a multifilament woven scrim (130-210 g/m²). The scrim element can be made of any polytetrafluoroethylene, but preferably is expanded, porous polytetrafluoroethylene. The felts are made up of staple fibers, (usually 6.7 denier/filament, or 7.4 dtex/filament) and are 5-20 cm in length.

In one embodiment, there may be a further layer added to the filter media, such as a wrap of a non-woven polypropylene material or an adsorbent component for capturing mercury on the downstream side of the filter media. In another embodiment, the filter media may comprise one or more catalysts for converting contaminants such as NOx, NH3, CO, dioxin, furan, or ozone. The catalyst may comprise an active material such as $TiO_2$, $V_2O_3$, $WO_3$, $MnO_2$, Pt or $Al_2O_3$. With a catalyst, contaminants such as dioxins, furans, NOx, CO, and the like, can be effectively removed from a fluid stream.

Figure 3:
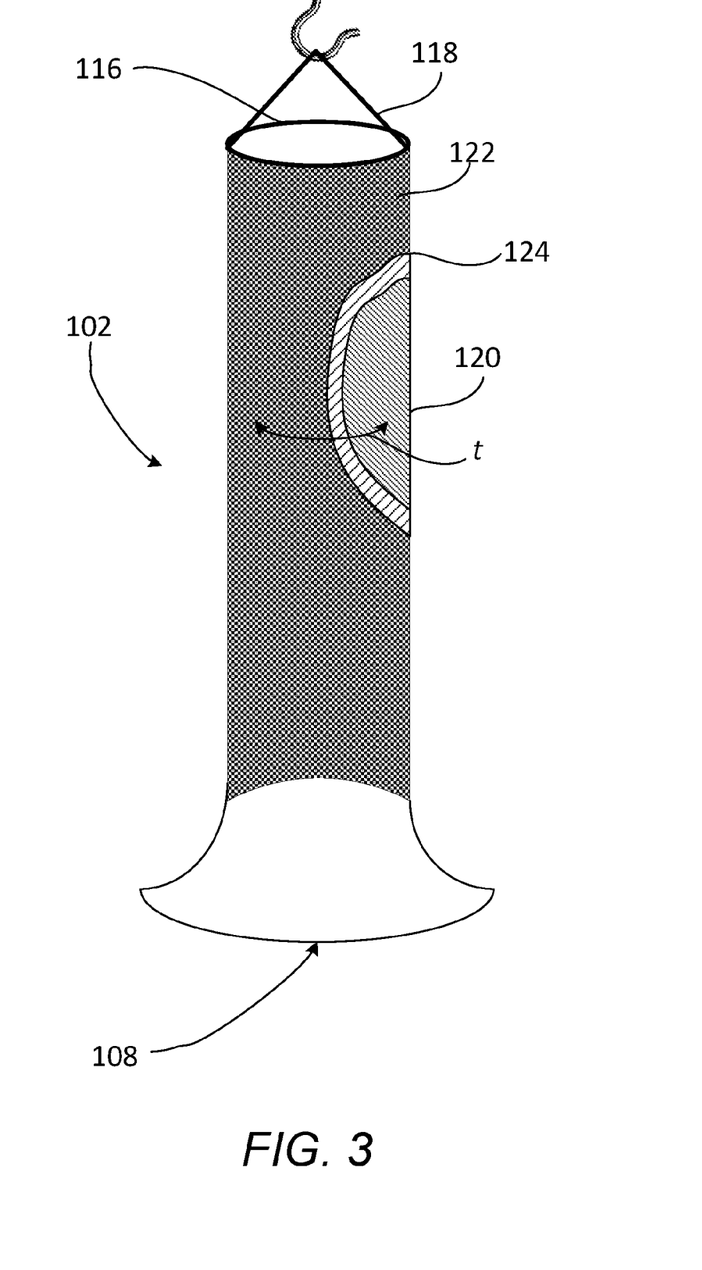
FIG. 3 shows a cut-away perspective view of a filter bag with a porous membrane adjacent to a filter media in accordance with the embodiments disclosed herein.

FIG. 3 is a filter assembly 100 comprising a filter bag 102 attached to a shaker mechanism (not shown). For illustration purposes, the layers of the filter bag 102 are cut-away. Filter bag 102 has a cap 116 at one end and an opening 108 at the opposite end to allow cleaned air to pass through and out. The filter assembly 100 include a wire 118 for mounting the filter assembly 100 to a shaker mechanism (not shown). The filter bag 102 comprises a porous membrane 120, as described herein, that is attached to filter media 122 using an adhesive layer 124. The adhesive layer 124 may be a continuous layer or a grid, lines or pattern of adhesive forming a discontinuous layer. The porous membrane 120 has a bubble point of 0.06 MPa or more and a strength in the transverse direction (t) that is 100 N/m or more. As shown in FIG. 3, the porous membrane 120 is shown on the internal surface of the filter media 122.

Support Substructures

Support substructures that may be used in the filter elements of the present invention can vary widely depending on a number of conditions, including the configuration of the filter assembly, the type of material to be filtered, the filtration system into which the filter assembly will be incorporated, cleaning mechanism, and the like. For example, suitable support structures for use in the present application include cages, rings, or braces that may be fabricated from materials such as metals, plastics, and natural fibers, including woven or nonwoven forms, such as spunbonded polyester or nonwoven aramid felt materials. In one embodiment, the support substructure may be metal or plastic meshes. Wire supports cages may also be used as support substructures. In other embodiments, the support substructure may be a rigid self-supporting insert.

In one embodiment, the support substructure comprises a cage that may be constructed as one, unitary piece or assembled from multiple pieces. The cage may have a cover to provide a barrier between the cage and the filter media. The cover may reduce contact between the filter media and the support substructure.

Figure 4:
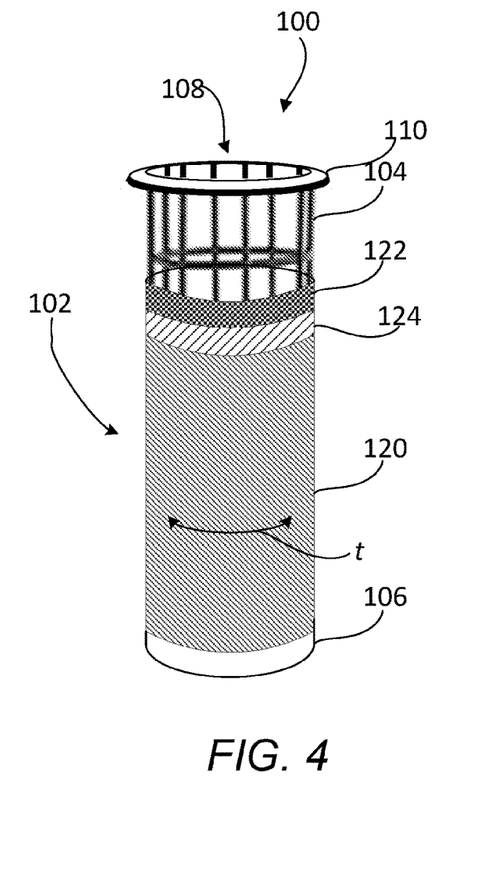
FIG. 4 shows a perspective view of a filter assembly having a filter bag with a porous membrane adjacent to a filter media in accordance with the embodiments disclosed herein.

FIG. 4 is a filter assembly 100 comprising a filter bag 102 fitted around a support substructure 104, which is shown as a metal cage. For illustration purposes, the layers of the filter bag 102 are pulled down, but it should be understood that these layers cover the support substructure 104. As shown in FIG. 3, the support substructure 104 is a wire cage that is used for pulse-jet cleaning. Filter bag 102 has a cuff portion 106 at one end and an opening 108 at the opposite end to allow cleaned air to pass through and out. The filter assembly 100 include a retaining portion 110 for mounting a bag to a tube sheet. In other embodiments, the filter assembly may have a hook or other fastener for securing the filter assembly 100 within the baghouse. The filter bag 102 comprises a porous membrane 120, as described herein, that is attached to filter media 122 using an adhesive layer 124. The porous membrane 120 shown in FIG. 4 has a bubble point of 0.06 MPa or more and a strength in the transverse direction (t) that is 100 N/m or more.

Sacrificial Material

Although the porous media is shown as attached directly to the filter media in FIG. 4, in other embodiments, there may be a sacrificial material disposed between the filter media and the porous membrane. This sacrificial material prevents the abrasive topology of the filter media from causing structural failures in the porous membrane. The sacrificial material protects the porous media without causing a loss in particulate collection. In one embodiment, there is provided a cleanable filter bag assembly for filtering particulates from a gas stream comprising a support substructure, and a filter bag at least partially surrounding the support substructure comprising a laminate of a membrane and a second layer comprising a sacrificial material. The laminate may include an upstream surface of the porous membrane exposed to the gas stream, while the second layer is attached to the filter media.

The second layer may comprise a sacrificial material to create a smooth surface for adhering the membrane to the filter media. Due to the surface roughness of the filter media, the filter media may puncture the membrane when attached directly together. In one embodiment, the second layer reduces this occurrence by providing a barrier between the membrane and filter media. The second layer may be punctured by the filter media without causing damage to the porous membrane. The puncturing may occur during assembly or during cleaning. Thus, the porous membrane retains its particulate retention and continues to operate without suffering structural issues that detract from the durability.

In this embodiment, the porous membrane attached to a second layer has a strength in a transverse direction that is 50 N/m or more, e.g., 60 N/m or more or 100 N/m or more. In this embodiment, the porous membrane may have a relatively lower transverse strength as compared to embodiments that use a porous membrane attached to the filter media due to the presence of the second layer between the porous membrane and filter media. In addition, when the porous membrane is used as a laminate, the bubble point of the porous membrane is 0.06 MPa or more, e.g., 0.2 MPa or more or 0.5 MPa or more.

The second layer may be a woven textile, a non-woven textile, or a membrane. In one embodiment, a membrane such as a fluoropolymer membrane or a polyester membrane may be used as the second layer. A suitable membrane for the second layer may be porous having a permeability of 1 Frazier or more, e.g., 5 Frazier or more. When laminated to the porous membrane, the laminate may have a permeability of 2 Frazier or more. The size and weight of the second membrane layer may vary depending on the sacrificial material. In one embodiment, the second membrane layer has a mass to area ratio from 0.25 to 50 gsm.

In other embodiments, the sacrificial layer can be formed from a variety of conventional fibers including, but not limited to, cellulosic fibers such as cotton, hemp or other natural fibers, inorganic fibers including glass fibers, carbon fibers or organic fibers such as polyesters, polyimides, polyamides, polyolefins, or other conventional fibers or polymeric materials and mixtures thereof.

The sacrificial materials in the laminate can be woven or non-woven. In woven bags, the fibers are typically formed into an interlocking mesh of fiber in a typical woven format. Non-woven fabrics are typically made by loosely forming the fibers, in no particular orientation, and then binding the fibers into a filter fabric. One mode of constructing the second layer is using a felt media as a substrate. Felts are a compressed, porous, non-woven fabric made by laying discrete natural or synthetic fibers and compressing the fibers into a felt layer using commonly available felt bonding technology that would be known to one skilled in the art.

Figure 5:
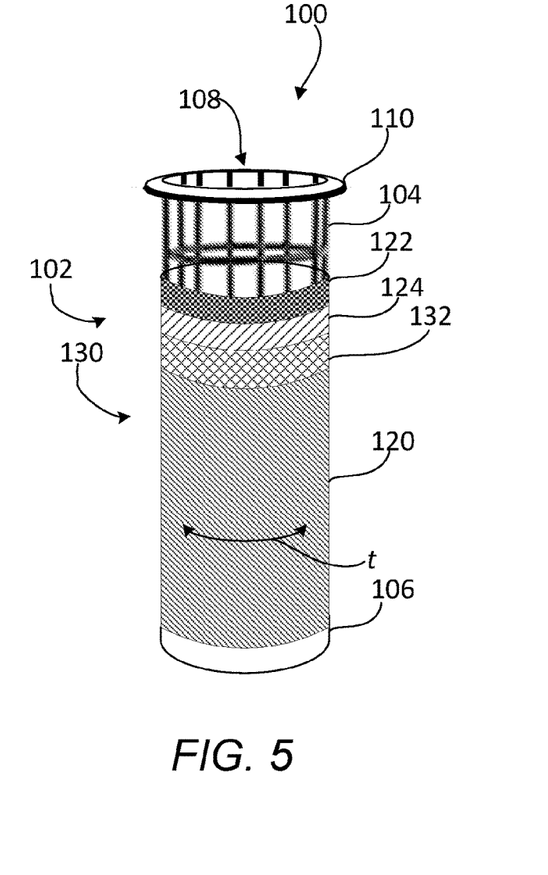
FIG. 5 shows a perspective view of another filter assembly having a filter bag with a laminate adjacent to a filter media in accordance with the embodiments disclosed herein.

The filter assembly 100 shown in FIG. 5 comprises a laminate 130 of a porous membrane 120 and a second layer 132 that comprises a sacrificial material. A filter bag 102 is fitted around a support substructure 104, which is shown as a metal cage. Similar to FIG. 4, for illustration purposes, the layers of the filter bag 102 and laminate 130 are pulled down, but it should be understood that these layers cover the support substructure 104. Similar to FIG. 4, a cuff portion 106 is shown at one end and an opening 108 at the opposite end to allow cleaned air to pass through and out the filter bag 102. The filter assembly 100 has a retaining portion 110 for mounting a baghouse to a tube sheet. In other embodiments, the filter assembly 100 may have a hook or other fastener for securing the filter assembly 100 within the bag house. The filter bag 102 comprises a laminate 130 that is attached to a filter media 122 using an adhesive layer 124. The laminate has an upstream surface that is the porous membrane 120 and a downstream surface that is the second material 132, as described above. In FIG. 5, the second material 132 is a membrane. When formed as a laminate, the porous membrane 120 has a bubble point of 0.06 or more. In one embodiment, the porous membrane 120 may also have a strength in the transverse direction (t) that is 50 N/m or more, e.g., 100 N/m or more or 175 N/m or more.

Seam Sealing Tape

The filter bag may comprise at least two adjacent edge portions joined by a seam, and a seam tape comprising a layer of an expanded fluoropolymer and a material for adhering to and sealing the seam. The seam tape may be disposed over the seam on the porous membrane upstream surface and/or on the downstream surface of the filter media.

In one embodiment, the seam sealing tape may be comprise an expanded fluoropolymer which has a crosswise direction matrix modulus of greater than about 1,950 psi at room temperature and an enthalpy ratio of less than 0.6, as described in U.S. Pat. No. 8,790,432, the entire contents and disclosures of which is hereby incorporated by reference.

The seam joining the sheet of filter media can be formed by conventional methods, such as sewing or heat welding. The material, size, and nature of the thread used to join filter media portions to form the seam of the filter depends upon the filter media, the other materials which may be used to form the filter, and the ultimate use of the filter. The manner in which the seam on the filter bag is sewn may be varied. For example, the seam may be a felled seam, the seam may be straight-stitched with a binder strip inserted between the edges of the filter media prior to sewing the seam, or the seam may be over-stitched.

The filter bag provided by way of the present invention has a variety of suitable end uses. In particular, the filter bag may be used to filter paints and coatings, especially water-based paints and primers, chemicals, petrochemical products, water, aqueous solutions and suspensions, and the like. The filter bag of the invention may be used in the production of minerals, chemicals, metals and energy. Most particularly, the filter bag having a membrane with a high transverse strength can be used to filter and collect particulate dust emissions in baghouses used in cement plants. The utility of the filter bag is in no way limited to these uses and includes most uses for conventional filter bags.

The present invention will be better understood in view of the following non-limiting examples and test results.

TEST METHODS

It should be understood that although certain methods and equipment are described below, any method or equipment determined suitable by one of ordinary skill in the art may be utilized.

Transverse Strength

The strength in the transverse direction is determined according to the test method of ASTM method D412-06a (2006), using die F. A universal testing machine capable of constant rate of extension (CRE) control is used to test the membrane that is shaped as a dog bone or dumbbell. To determine transverse strength, the dumbbell-shaped sample is placed in the grips. The rate of grip separation should be 500 to 50 mm/min. The machine starts to apply a separation force and the force at rupture is recorded.

Air Permeability—Frazier Number Determination

Air permeability of materials are determined according to test methods entitled ASTM D 737-75, "Standard Test Method for AIR PERMEABILITY OF TEXTILE FABRICS." Specifically, air permeability was measured by clamping a test sample in a gasketed flanged fixture which provided a circular area of approximately 6 square inches (3871 square mm) (2.75 inches (70 mm) diameter) for air flow measurement. The upstream side of the sample fixture was connected to a flow meter in line with a source of dry compressed air. The downstream side of the sample fixture was opened to the atmosphere.

Testing was accomplished by applying a pressure of 0.5 inches water gauge to the upstream side of the sample and recording the flow rate of the air passing through the in-line flowmeter (a ball-float rotameter).

Results are reported in terms of Frazier Number which is air flow in cubic feet/minute/square foot of a sample at 0.5 inches water gauge.

Bubble Point Test

Liquids with surface free energies less than that of stretched porous PTFE can be forced out of the structure with the application of a differential pressure. This clearing will occur from the largest passageways first. A passageway is then created through which bulk air flow can take place. The air flow appears as a steady stream of small bubbles through the liquid layer on top of the sample. The pressure at which the first bulk air flow takes place is called the bubble point and is dependent on the surface tension of the test fluid and the size of the largest opening. The bubble point can be used as a relative measure of the structure of a membrane and is often correlated with some other type of performance criteria, such as filtration efficiency.

Bubble point was determined via a Capillary Flow Porometer, CFP-1500, made by Porous Materials Inc. Silwick oil was used as the wetting fluid to fill the pores of the tested membrane. The surface tension of the silwick oil is 20.1 dyne/cm. The test area of the membrane is 2.84 cm$^2$. A metal support is placed beneath the sample test membrane to prevent the membrane from being deformed.

The Bubble Point is the pressure of air required to displace the wetting fluid from the largest pores of the test specimen and create the first continuous stream of bubbles detectable by their rise through a layer of wetting fluid covering the porous media. This measurement provides an estimation of maximum pore size.

Mass Per Area

The mass per area of samples was measured by the following method. Four samples of the membrane using a D412F die (dogbone shaped) with an area 2.03 in2 are punched using a clicker press. The mass of each of these four punched samples is measured and recorded in units of grams.

The mass of each sample is converted to mass/area in units of $g/m^2$ in the following way. Mass/area (g/m2)=[mass of membrane sample punched from Die D412F (g)×39.372] ÷2.03 which simplifies to: mass/area (g/m2)=mass of membrane sample punched from Die D412F (g)×763.5. The average value is reported as the mass/area of the membrane in units of $g/m^2$.

Pressure Drop

The change in pressure drop is measured using method ISO 11057 (First edition; May 15, 2011). Where the residual pressure drop is taken 4 seconds after a pulse. In the aging test method, the residual pressure drop after cycle 1 and cycle 2500 are taken. The dP Rise is defined as the difference between the residual pressure drops at cycle 2500 and cycle 1: dP Rise=Res $dP_{Cycle\ 2500}$–Res $dP_{Cycle\ 1}$. The lower rise in the pressure drop indicates a more cleanable filter assembly.

Particle Capture

The filtration efficiency in capturing particles is determined using an Automated Filter Tester Model 3160 (TSI). The flow rate for measuring is 32 L/min. The 3160 challenges the filter with up to 20 different monodisperse particle sizes in the range from 15 to 800 nm. The penetration value for each particle size is calculated. At the end of a test, the Model 3160 generates a curve of penetration vs. particle size and produces a summary of test results, including the most penetrating particle size (MPPS).

Ball Burst Strength

This test measures the relative strength of a sample of media by determining the maximum load at break. The media is challenged with a 1 inch (2.54 cm) diameter ball while being clamped between two plates. The Chantillon, Force Gauge/Ball Burst Test was used.

The media is placed taut in the measuring device and pressure affixed by raising the web into contact with the ball of the burst probe. Pressure at break is recorded.

EXAMPLES

Example 1

An expanded polytetrafluoroethylene (ePTFE) membrane having a mass-to-area ratio of 2.2 gsm, permeability of 2.6 cfm/ft²/min and a bubble point of 0.09 MPa was adhered to a PTFE felt without using an adhesive. Table 1 reports the durability and cleanability using a pulse-jet cleaning technique. As indicated in Table 1, example 1 exhibits acceptable durability with some damage and an excellent cleanability.

Example 2

A filter was prepared in a similar manner as Example 1. Table 1 indicates the characteristics of the ePTFE membrane. As indicated in Table 1, example 1 exhibits acceptable durability with some damage and an excellent cleanability.

Comparative Example A

A filter was prepared in a similar manner as Example 1, but an ePTFE membrane having a lower transverse strength as shown in Table 1. Due to the lower transverse strength, comparative example A suffers from damage and has a limited durability as reported in Table 1.

Comparative Example B

A filter was prepared in a similar manner as Example 1, but an ePTFE membrane having more open microstructure indicated by the lower bubble point of 0.013 MPa as shown in Table 1. Due to the open structure, comparative example B has poor cleanability as reported in Table 1 and thus an increased pressure drop.

TABLE 1

| # | Transverse Strength (N/M) | Mass-to-area ratio (GSM) | Permeability (cfm/ft²/min) | Bubble Point (MPa) | Durability | Cleanability |
| --- | --- | --- | --- | --- | --- | --- |
| 1 | 124 | 2.2 | 2.6 | 0.09 | Acceptable | Excellent |
| 2 | 200 | 4.1 | 1.9 | 0.09 | Acceptable | Excellent |
| Comp. A | 94 | 1.62 | 2.5 | 0.15 | Damaged | Excellent |
| Comp. B | 168 | 3.5 | 17.5 | 0.013 | Excellent | Not acceptable |

Figure 6:
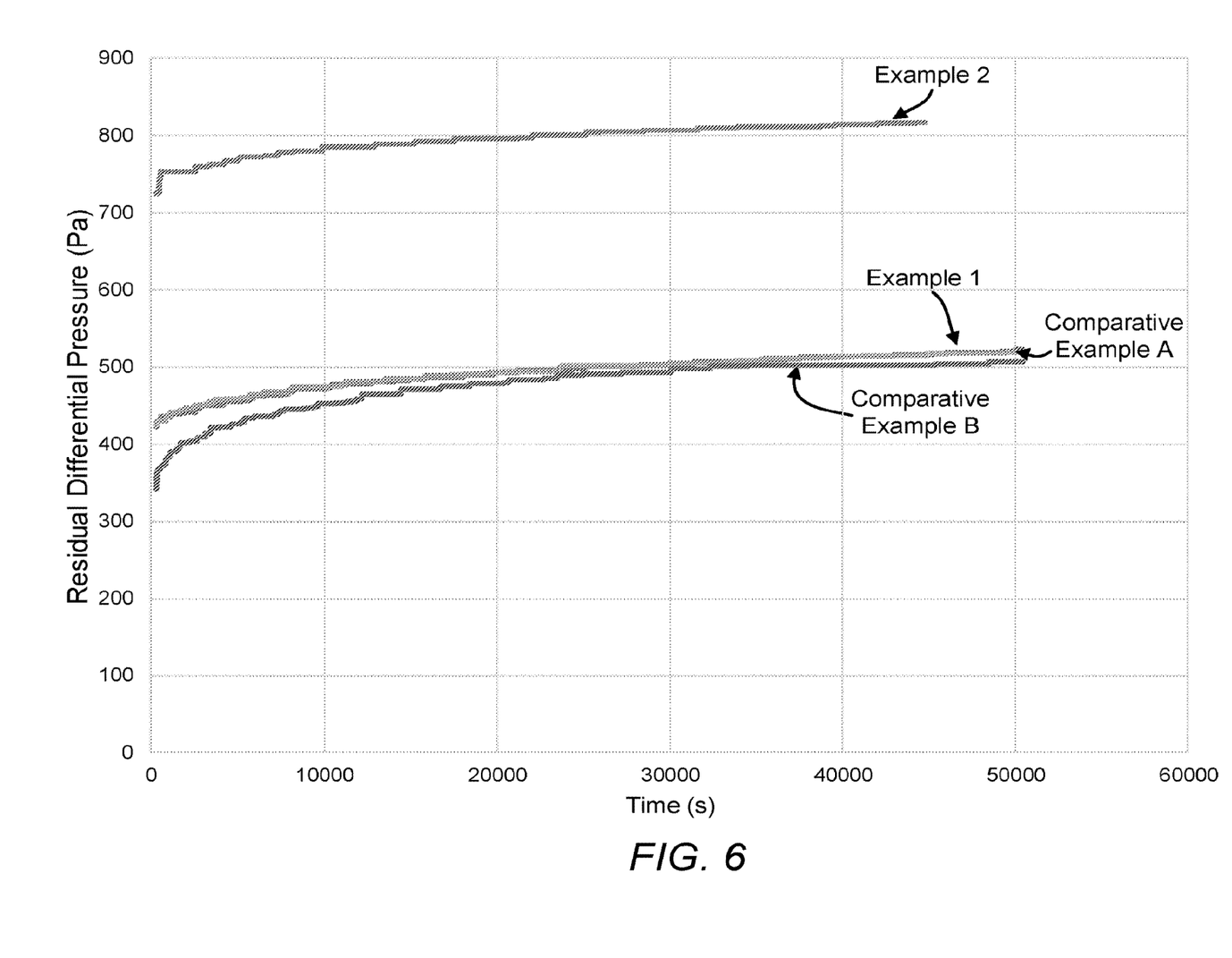
FIG. 6 is a graph of the rise of differential pressure of a porous membrane adjacent to a filter media compared with an comparative example.

The rise in differential pressure is compared between example 1 or 2 and comparative example A or B and shown in FIG. 6. The single layer membrane having a tight microstructure and higher transverse strength shows a significant improvement by having a rise in differential pressure of 100 Pa (example 1) and 92 Pa (example 2). In contrast comparative example A that has damage had a differential pressure rise of 93 Pa, while comparative example B had good durability but a differential pressure rise of 148 Pa.

Examples 3 and 4

Laminates comprising a porous membrane as the top layer (facing upstream) and a sacrificial layer (bottom layer) adjacent to the filter media. The mass-to-area ratio and permeability of each layer are reported in Table 2. The filter media for these examples was 22 oz woven fiberglass and the laminate was adhered using a PTFE dispersion coating. The transverse strength of the porous membrane was greater than 50 N/m. Table 2 reports the durability and cleanability using a pulse-jet cleaning technique. Both examples 3 and 4 exhibits excellent durability and cleanability.

TABLE 2

| # | Bubble Point (MPa) | Top Layer | | Bottom Layer | | Durability | Cleanability |
|---|---|---|---|---|---|---|---|
| | | Mass-to-area ratio (GSM) | Permeability (cfm/ft$^2$/min) | Mass-to-area ratio (GSM) | Permeability (cfm/ft$^2$/min) | | |
| 3 | 0.09 | 3.27 | 2.3 | 4.8 | 40 | Excellent | Excellent |
| 4 | 0.21 | 1 | 3.5 | 4.8 | 40 | Excellent | Excellent |

Figure 7:
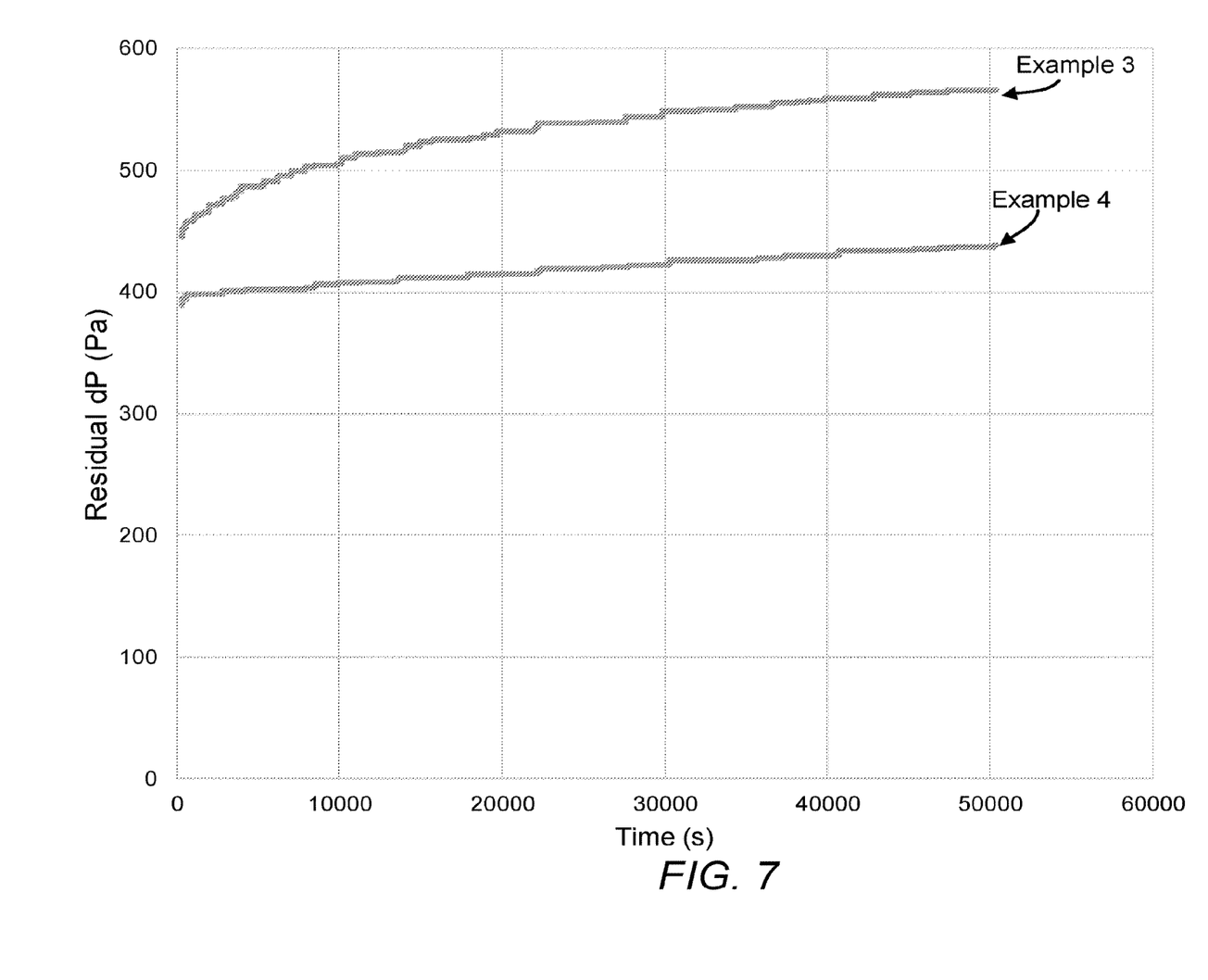
FIG. 7 is a graph of the rise of differential pressure of a porous membrane adjacent to a filter media compared with an comparative example.

FIG. 7 is a graph showing the rise in differential pressure for a laminate in Example 3 of 120 Pa and for Example 4 is 42 Pa. This is a significant improvement over a conventional filter.

The invention has now been described in detail for the purposes of clarity and understanding. However, those skilled in the art will appreciate that certain changes and modifications may be practiced within the scope of the appended claims.

In the preceding description, for the purposes of explanation, numerous details have been set forth in order to provide an understanding of various embodiments of the present invention. It will be apparent to one skilled in the art, however, that certain embodiments may be practiced without some of these details, or with additional details.

Having disclosed several embodiments, it will be recognized by those of skill in the art that various modifications, alternative constructions, and equivalents may be used without departing from the spirit of the embodiments. Additionally, a number of well-known processes and elements have not been described in order to avoid unnecessarily obscuring the present invention. Accordingly, the above description should not be taken as limiting the scope of the present invention or claims.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the present invention, subject to any specifically excluded limit in the stated range. Where the stated range includes one or both of the limits, ranges excluding either or both of those included limits are also included.

As used herein and in the appended claims, the singular forms "a", "an", and "the" include plural references unless the context clearly dictates otherwise. Also, the words "comprise," "comprising," "contains," "containing," "include," "including," and "includes," when used in this specification and in the following claims, are intended to specify the presence of stated features, integers, components, or steps, but they do not preclude the presence or addition of one or more other features, integers, components, steps, acts, or groups.

In the following, further examples are described to facilitate understanding of the disclosure:

E1. A filter assembly for filtering particulates from a gas stream comprising: a filter bag comprising a filter media and a porous membrane having an upstream surface exposed to the gas stream and a downstream surface adjacent to the filter media, wherein the porous membrane has a bubble point of 0.06 MPa or more and wherein the porous membrane has a strength in a transverse direction that is 100 N/m or more, wherein the filter assembly is cleanable.

E2. The filter assembly of example E1, wherein the filter media comprises a woven felt, non-woven felt or a fiberglass material.

E3. The filter assembly of any one of examples E1 or E2, wherein the porous membrane has a structure to collect the particulates on the upstream surface.

E4. The filter assembly of example E3, wherein the porous membrane is capable of withstanding structural failures caused by stresses of a cleaning process to release the collected particulates from the upstream surface of the porous membrane.

E5. The filter assembly of any one of examples E1-E4, wherein the porous membrane comprises a fluoropolymer membrane or a polyester membrane.

E6. The filter assembly of any one of examples E1-E5, wherein the porous membrane has a strength in the transverse direction that is 175 N/m or more.

E7. The filter assembly of any one of examples E1-E6, wherein the porous membrane has a mass per area ratio of 4.5 gsm or less.

E8. The filter assembly of any one of examples E1-E7, wherein the porous membrane has a Ball Burst strength of 1.36 kg or less.

E9. The filter assembly of any one of examples E1-E8, wherein the porous membrane has a permeability of 1 cfm/ft$^2$ @ 0.5 inch gauge of water.

E10. The filter assembly of any one of examples E1-E9, wherein the porous membrane has a thickness from 5 to 50 microns.

E11. The filter assembly of any one of examples E1-E10, wherein the porous membrane has a bubble point of 0.09 MPa or more.

E12. The filter assembly of any one of examples E1-E11, wherein the porous membrane collects more than 97% of the particulates having a diameter of greater than 0.07 microns from the gas stream.

E13. A baghouse filter system comprising: a housing having an inlet and an outlet; a tube sheet positioned within the housing between the inlet and outlet; and one or more of the filter bag assemblies of any one of examples E1-E12 mounted to the tube sheet.

E14. A filter assembly for filtering particulates from a gas stream comprising: a filter bag comprising a filter media, a porous membrane having an upstream surface exposed to the gas stream, and second layer, wherein the second layer is disposed between the filter media and porous membrane, wherein the porous membrane has a bubble point of 0.06 MPa or more, wherein the filter assembly is cleanable.

E15. The filter assembly of examples E14, wherein the porous membrane has a bubble point of 0.09 MPa or more.

E16. The filter assembly of any one of examples E14 or E15, wherein the second layer has a permeability of 10 cfm/ft$^2$ @ 0.5 inch gauge of water.

E17. The filter assembly of any one of examples E14-E16, wherein the second layer and the porous membrane are laminated together to form a laminate.

E18. The filter assembly of any one of examples E14-E17, wherein the second layer comprises a woven textile, a non-woven textile, or a membrane.

E19. The filter assembly of any one of examples E14-E18, wherein the second layer is laminated to the filter media.

E20. The filter assembly of any one of examples E14-E19, wherein the filter media comprises a woven felt, non-woven felt or a fiberglass material.

E21. The filter assembly of any one of examples E14-E20, wherein the porous membrane has a structure to collect the particulates on the upstream surface.

E22. The filter assembly of example E21, wherein the porous membrane is capable of withstanding structural failures caused by stresses of a cleaning process to release the collected particulates from the upstream surface of the porous membrane.

E23. The filter assembly of any one of examples E14-E22, wherein the porous membrane comprises a fluoropolymer membrane or a polyester membrane.

E24. The filter assembly of any one of examples E14-E23, wherein the porous membrane has a strength in the transverse direction that is 50 N/m or more.

E25. The filter assembly of any one of examples E14-E24, wherein the porous membrane has a strength in the transverse direction that is 100 N/m or more.

E26. The filter assembly of any one of examples E14-E25, wherein the porous membrane has a strength in the transverse direction that is 175 N/m or more.

E27. The filter assembly of any one of examples E14-E26, wherein the porous membrane has a mass per area ratio of 4.5 gsm or less.

E28. The filter assembly of any one of examples E14-E27, wherein the porous membrane has a Ball Burst strength of 1.36 kg or less.

E29. The filter assembly of any one of examples E14-E28, wherein the porous membrane has a permeability of 1 cfm/ft$^2$ @ 0.5 inch gauge of water.

E30. The filter assembly of any one of examples E14-E29, wherein the porous membrane has a thickness from 5 to 50 microns.

E31. The filter assembly of any one of examples E14-E30, wherein the porous membrane collects more than 97% of the particulates having a diameter of greater than 0.07 microns from the gas stream.

E32. The filter assembly of any one of examples E14-E31, is cleaned by a pulse jet, reverse air, or shaker cleaning technique.

E33. A baghouse filter system comprising: a housing having an inlet and an outlet; a tube sheet positioned within the housing between the inlet and outlet; and one or more of the filter bag assemblies of any one of examples E14-E32 mounted to the tube sheet.

What is claimed is:

1. A filter assembly comprising:
   a filter bag comprising:
      a filter media;
      a porous membrane,
         wherein the porous membrane includes an upstream surface configured to be exposed to a gas stream,
         wherein the porous membrane has a bubble point of 0.06 MPa or more, and
      a second layer,
         wherein the second layer is disposed between the filter media and the porous membrane,
      wherein the filter bag is cleanable and durable, and
   wherein the filter assembly is configured to filter particulates from the gas stream, and wherein the second layer comprises a membrane with a bubble point of 0.2 MPa and a transverse strength of 127 N/m.

* * * * *